United States Patent
Guo

(10) Patent No.: US 10,748,344 B2
(45) Date of Patent: Aug. 18, 2020

(54) METHODS AND DEVICES FOR USER INTERACTION IN AUGMENTED REALITY

(71) Applicant: SEIKO EPSON CORPORATION, Tokyo (JP)

(72) Inventor: Xiang Guo, Markham (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/128,860

(22) Filed: Sep. 12, 2018

(65) Prior Publication Data
US 2020/0082626 A1   Mar. 12, 2020

(51) Int. Cl.
| G06T 19/00 | (2011.01) |
| G06T 7/73 | (2017.01) |
| G06F 3/01 | (2006.01) |
| G02B 27/01 | (2006.01) |
| G06T 7/13 | (2017.01) |

(52) U.S. Cl.
CPC ........ G06T 19/006 (2013.01); G02B 27/0172 (2013.01); G06F 3/013 (2013.01); G06T 7/74 (2017.01); *G02B 2027/014* (2013.01); *G02B 2027/0138* (2013.01); *G02B 2027/0178* (2013.01); *G06T 7/13* (2017.01)

(58) Field of Classification Search
CPC .......... G06F 3/013; G06F 3/014; G06F 3/017; G02B 27/01–0189; G02B 2027/0105–0198; G06T 19/006; H04N 13/332
See application file for complete search history.

(56) References Cited

U.S. PATENT DOCUMENTS

| 9,448,407 B2 | 9/2016 | Kimura | |
| 10,417,781 B1* | 9/2019 | Konolige | G06F 16/5854 |
| 2004/0193413 A1* | 9/2004 | Wilson | G06F 3/017 |
| | | | 704/243 |
| 2005/0073531 A1* | 4/2005 | Kuroki | G06T 19/006 |
| | | | 345/633 |
| 2013/0335303 A1* | 12/2013 | Maciocci | G06F 3/011 |
| | | | 345/8 |
| 2015/0221133 A1* | 8/2015 | Groten | G06K 9/00671 |
| | | | 345/633 |
| 2017/0059871 A1* | 3/2017 | Hashiba | G02B 27/0179 |
| 2017/0286750 A1* | 10/2017 | Levinshtein | G06F 30/00 |
| 2017/0287165 A1* | 10/2017 | Lam | G06T 7/251 |
| 2018/0060606 A1* | 3/2018 | Dascola | G06F 21/6245 |
| 2018/0137366 A1* | 5/2018 | Szeto | G06K 9/6212 |
| 2018/0284464 A1* | 10/2018 | Lu | G02B 27/14 |
| 2019/0065027 A1* | 2/2019 | Hauenstein | G06F 3/04815 |

* cited by examiner

*Primary Examiner* — Gene W Lee
(74) *Attorney, Agent, or Firm* — Oliff PLC

(57) ABSTRACT

A method includes acquiring, by a camera, an image frame of an object having known geometry in a real scene, and estimating a pose of the object in the image frame with respect to the camera. A cursor is displayed on a display by rendering the cursor at a 3D position in a 3D coordinate system. An output is presented to a user when a predetermined portion of the object falls at the 3D position. The content of the output is based on the predetermined portion of the object.

12 Claims, 14 Drawing Sheets

METHODS AND DEVICES FOR USER INTERACTION IN AUGMENTED REALITY

BACKGROUND

1. Technical Field

The disclosure relates generally to the field augmented reality, and more specifically to methods and systems for user interaction in augmented reality.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

One platform for implementing AR is the smartphone or tablet. The presence of a camera, display device, and processor on the same device allows for software to easily add artificial elements to a live scene captured by the camera. Moreover, the presence of motion sensors and locators (e.g. accelerometers and GPS) on these devices is exploited by the software to better implement AR.

Another platform is the head mounted display (HMD) which can implement AR providing richer AR experience. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

In at least some known AR systems, the user is unable to interact with the AR environment, and the user is limited to viewing the AR environment without the ability to determine what is shown or obtain additional information.

SUMMARY

To enhance the user's AR experience, embodiments of the present disclosure allow a user to select an object or a portion of an object and receive an output from the AR device that is based on the selected object or portion of the object. The output is a human cognizable output, such as a visual display in the AR scene or on a separate display, an audio output, a haptic output (such as a vibration), or any other suitable output.

An advantage of some aspects of the disclosure is to solve at least a part of the problems described above, and aspects of the disclosure can be implemented as the following aspects.

One aspect of the disclosure is a method for one or more processors to implement in a device having a camera and a display. The method includes acquiring, by the camera, an image frame of an object having known geometry in a real scene, and estimating a pose of the object in the image frame with respect to the camera. A cursor is displayed on the display by rendering the cursor at a 3D position in a 3D coordinate system, and an output is presented presenting an output to a user when a predetermined portion of the object falls at the 3D position. The content of the output is based on the predetermined portion of the object.

Another aspect of the present disclosure is a method for one or more processors to implement in device having a camera and a display. The method includes acquiring, by the camera, an image frame of an object in a real scene, and estimating a pose of the object in the image frame with respect to the camera. An output is presented to a user when the pose of the object falls within a predetermined pose. The content of the output is based on the predetermined pose.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The augmented reality (AR) methods described herein may be implemented on any suitable device or system that includes a camera and a display. Such suitable devices may include, for example, a mobile phone, a tablet computer, a desktop computer (with a camera), a smart watch, a digital camera, an AR headset (e.g., a transparent HMD), or the like. Embodiments of the instant disclosure will be described with reference to an HMD, but as noted above the methods may be implemented, with appropriate modification, on any suitable device or system that includes a camera and a display.

Figure 1:
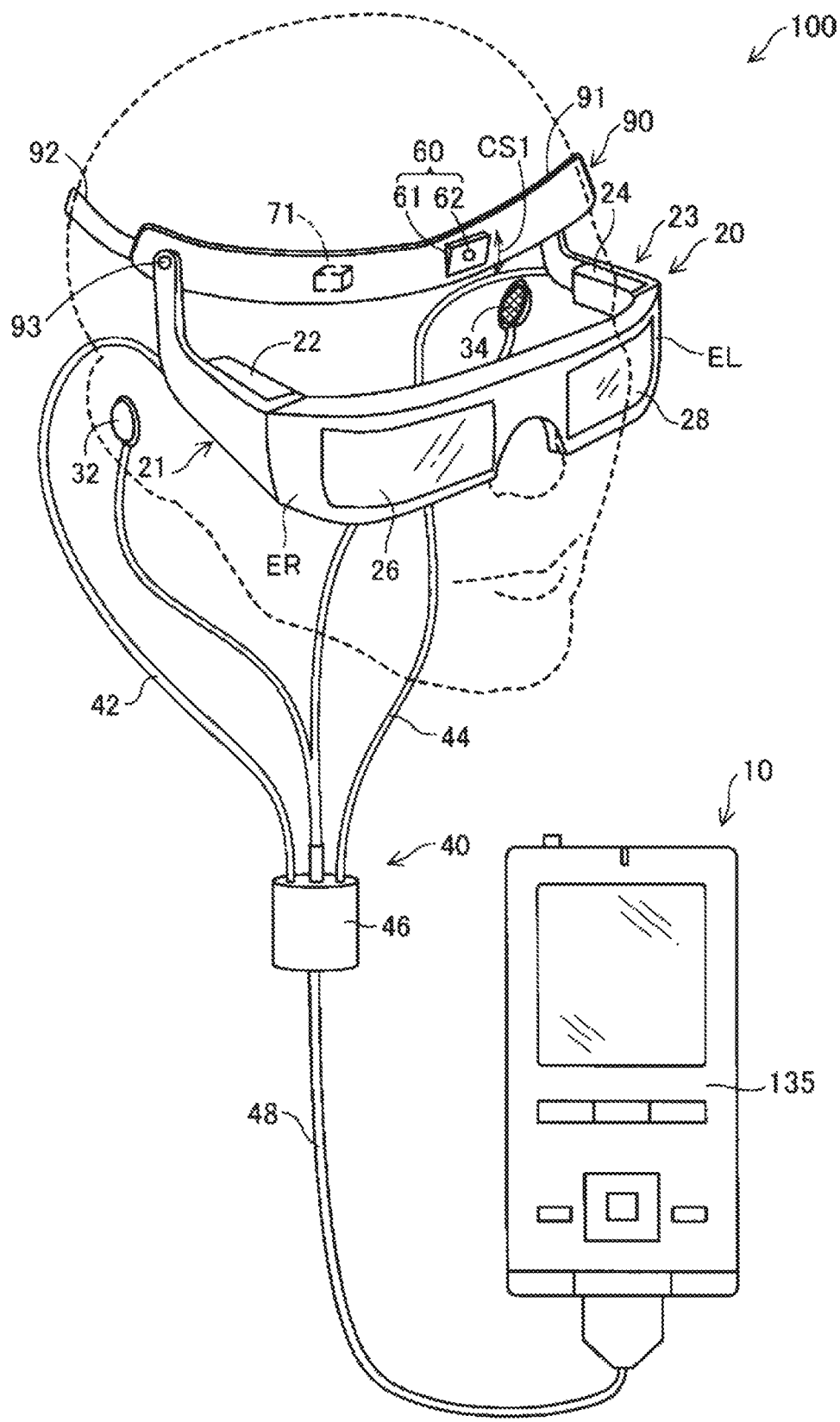
FIG. 1 is a diagram illustrating a schematic configuration of an example HMD.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable. In some other embodiments, the camera 60 and IMU 71 may be provided in the display section 20, so that they are fixed with respect to the display section 20. The spatial relationships represented by the rotation and translation matrices among the camera 60, IMU 70 and display section 20, which have been obtained by calibration, are stored in a memory area or device in the control section 10.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
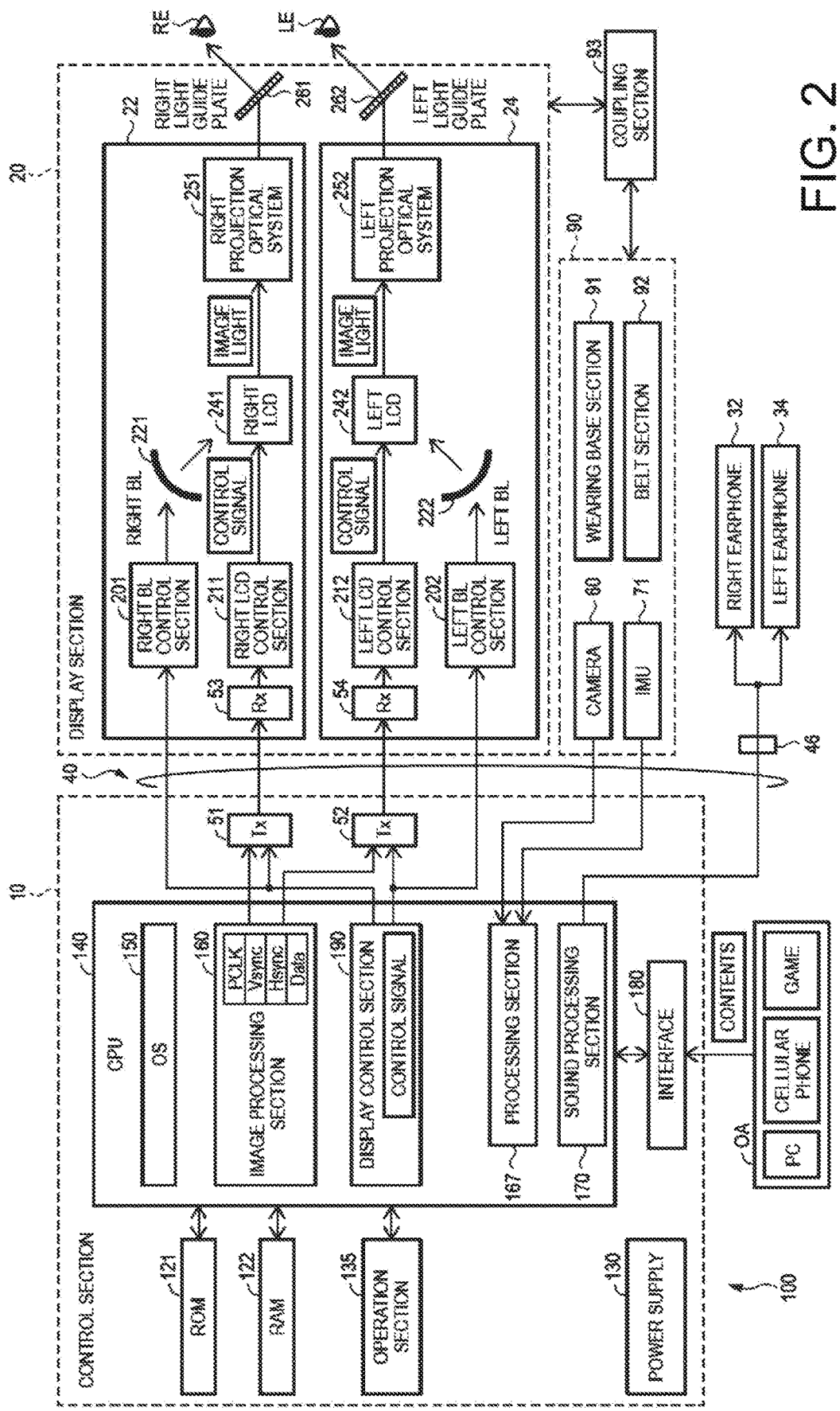
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitter 51 (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops or loads, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a nomography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The device to which the technology disclosed as an embodiment is applied may be an imaging device other than an HMD. For example, the device may be an imaging device that has no function of displaying an image. In other embodiments, the technology disclosed as an embodiment may be applied to any suitable device including a camera and a display, such as a mobile phone, a tablet computer, and the like.

Figure 3:
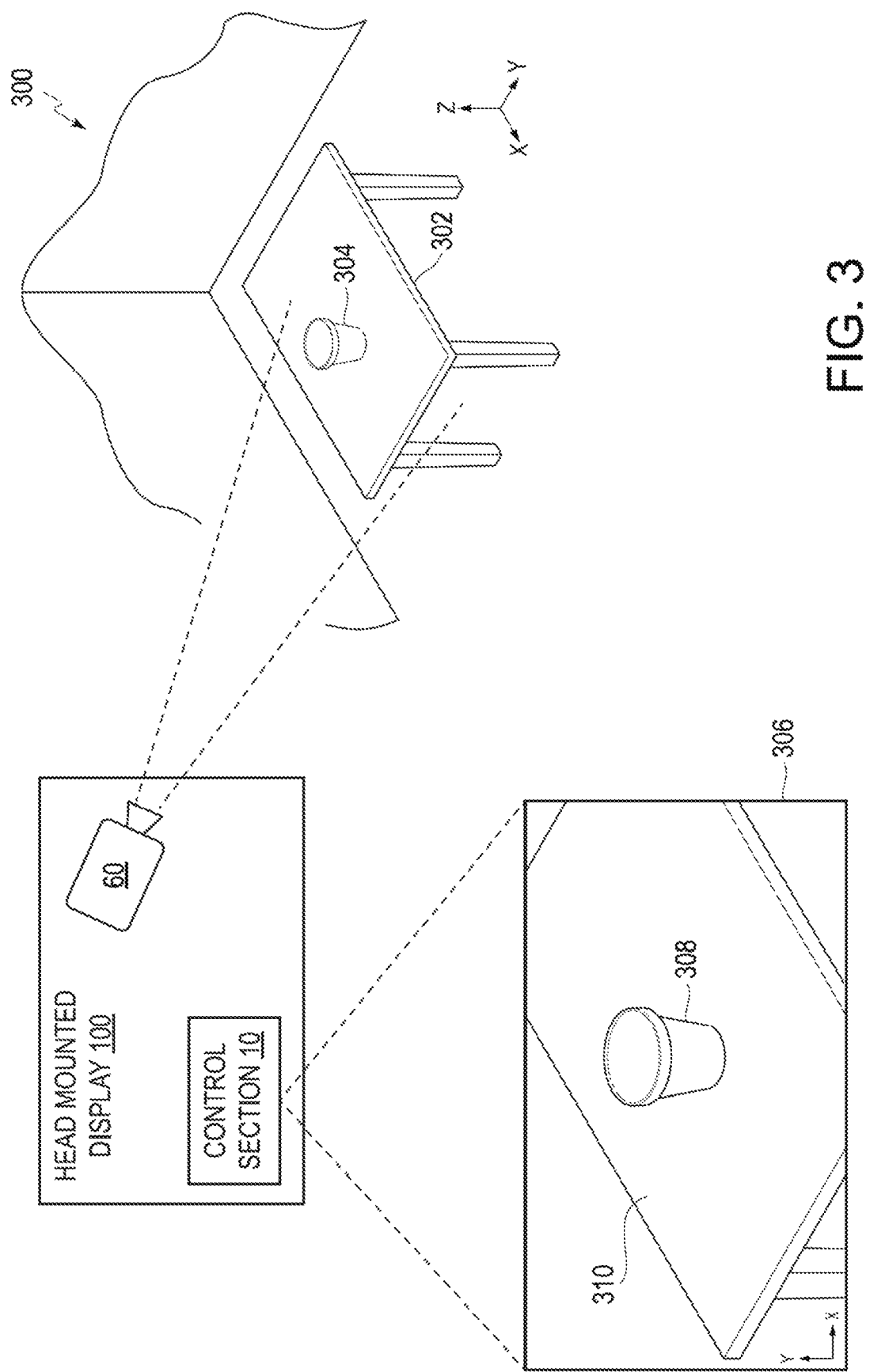
FIG. 3 is a diagram illustrating use of the HMD shown in FIGS. 1 and 2 in a three dimensional (3D) real-world scene.

FIG. 3 is a diagram illustrating use of the HMD 100 in a three dimensional (3D) real-world scene 300. Scene 300 includes a table 302 and an object 304 on the table 302. A user (not shown) wearing HMD 100 is positioned to view the scene 300. The camera 60 of the HMD 100 also views the scene 300 from approximately the same viewpoint as the user. In some embodiments a calibration is performed to derive a transformation matrix that fills any difference between the viewpoint of the camera and the viewpoint of the user in order to attempt to align the 3D coordinate system of the camera 60 with the 3D coordinate system of the user or the display in the HMD 100. The camera 60 captures images of the scene 300 from the viewpoint and provides an image data stream to the control section 10. The image data stream includes multiple temporally separate two dimensional (2D) image frames. FIG. 3 includes an example image frame 306, sometimes referred to as an image, received by the control section 10. The image frame 306 includes a representation 308 of the object 304 as viewed from the camera's viewpoint and a representation 310 of a portion of the table 302. A representation of an object, such as the representation 308 of object 304, in an image frame is sometimes also referred to herein as the object in the image frame.

As will be explained in more detail herein, the control section 10 attempts to locate the representation 310 of the object 304 in the image frame 306 and determine its pose. The control section 10 then attempts to track the representation 310 of the object 304 and update the pose of the object through subsequent image frames.

In the example embodiment described herein, the target pose estimation process relies on the use of previously prepared templates. An example description of preparation of such templates is included below. It should be understood that the pose estimation process may use templates created using different techniques and other pose estimation processes may be used that do not use any templates.

Template Creation

The templates are created by a template creator (not shown) that renders a 2D model of the target object on a virtual plane on the basis of a view $V_n$ of a 3D CAD as a 3D model. The template creator detects edges of an image obtained through the rendering, further extracts a contour, and selects a plurality of 2D model points included in the contour. A position of a selected 2D model point and gradient (a gradient vector of luminance) at the position of the 2D model point are represented by a contour feature CF. The template creator performs inverse transformation on a 2D model point $p_i$ represented by a contour feature $CF_i$ in the two dimensional space so as to obtain a 3D model point $P_i$ in the three dimensional space corresponding to the contour feature $CF_i$. Here, the 3D model point $P_i$ is represented in the object coordinate system. The template in the view $V_n$ includes elements expressed by the following Equation (1).

$$(CF_{1n}, CF_{2n}, \ldots, 3DP_{1n}, 3DP_{2n}, \ldots, V_n) \quad (1)$$

In Equation (1), a contour feature and a 3D model point (for example, $CF_{1n}$ and $3DP_{1n}$) with the same suffix are correlated with each other. A 3D model point which is not detected in the view $V_n$ may be detected in a view $V_m$ or the like which is different from the view $V_n$.

If a 2D model point p is provided, the template creator treats the coordinates of the 2D model point p as integers representing a corner of a pixel. Therefore, a depth value of the 2D model point p corresponds to coordinates of (p+0.5). As a result, the template creator uses the coordinates of (p+0.5) for inversely projecting the 2D point p. When a recovered 3D model point is projected, the template creator truncates floating-point coordinates so as to obtain integer coordinates.

The created templates are stored in memory of the device that is performing target object pose estimation, such as in ROM 121 of HMD 100.

Figure 4:
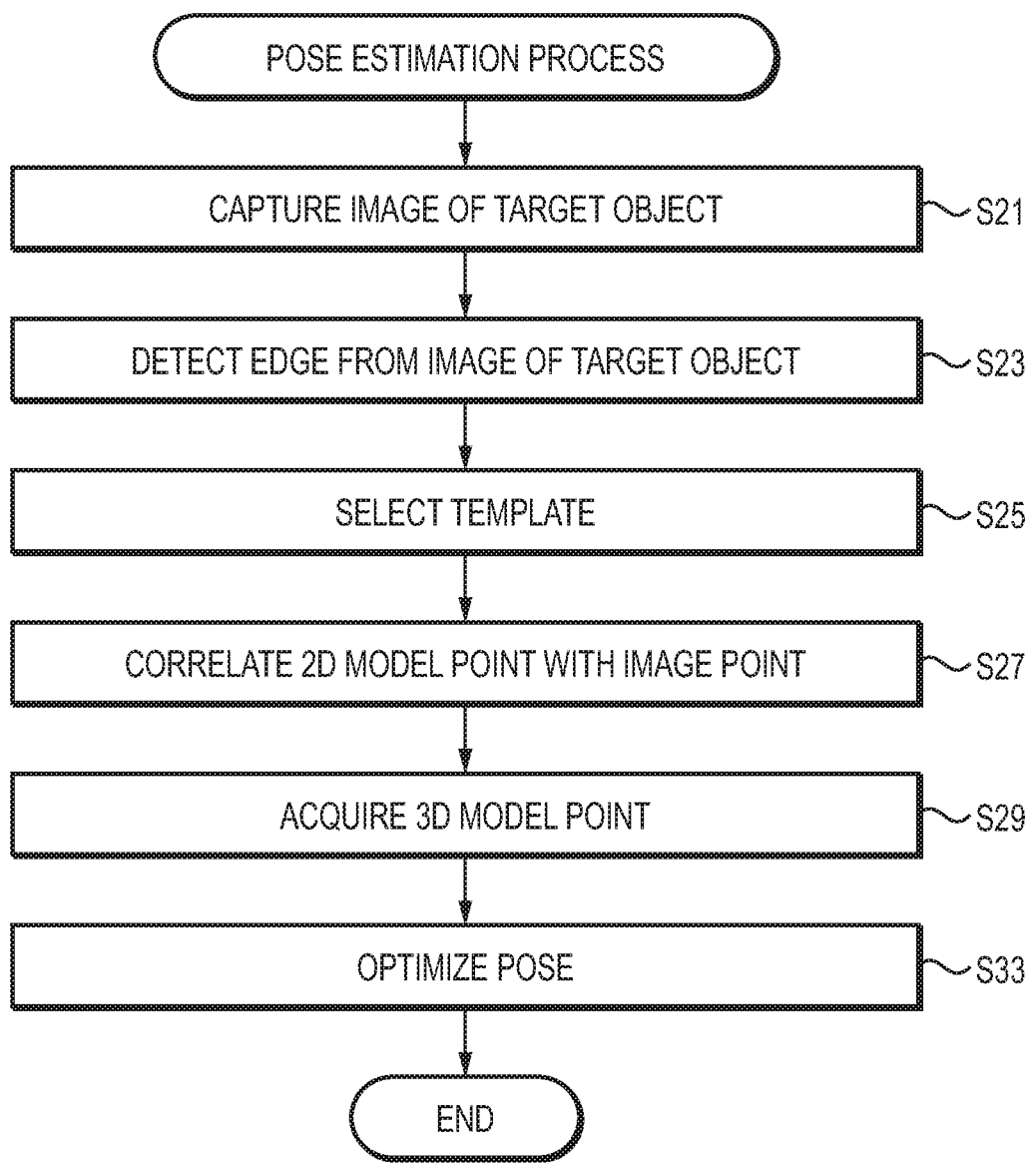
FIG. 4 is a flowchart illustrating a target object pose estimation process.

FIG. 4 is a flowchart illustrating a target object pose estimation process. The process will be described with reference to the HMD 100, but may be performed with any suitable device. Moreover, the methods and systems described herein are not limited to using the target object pose estimation process described herein, but may use any suitable technique or techniques for identifying a target object, estimating its pose and tracking the pose of the target object.

In the pose estimation process of FIG. 4, first, the processing section 167 images external scenery including a target object with the camera 60 (step S21). The processing section 167 performs edge detection described below on a captured image of the target object (step S23).

Edge Detection (Step S23)

The processing section 167 detects an edge of the image of the target object in order to correlate the imaged target object with a template corresponding to the target object. The processing section 167 computes features serving as the edge on the basis of pixels of the captured image. In the present embodiment, the processing section 167 computes gradient of luminance of the pixels of the captured image of the target object so as to determine the features. When the edge is detected from the captured image, objects other than the target object in the external scenery, different shadows, different illumination, and different materials of objects included in the external scenery may influence the detected edge. Thus, it may be relatively difficult to detect the edge from the captured image may than to detect an edge from a 3D CAD model. In the present embodiment, in order to more easily detect an edge, the processing section 167 only compares an edge with a threshold value and suppresses non-maxima, in the same manner as in procedures performed in a simple edge detection method.

Selection of Template (Step S25)

If the edge is detected from the image of the target object, the processing section 167 selects a template having a view closest to the pose of the target object in a captured image thereof from among templates stored in a template storage of HMD 100 (step S25). The template storage may be in ROM 121, or any other suitable storage device.

For this selection, an existing three-dimensional pose estimation algorithm for estimating a rough pose of a target object may be used separately. The processing section 167 may find a new training view closer to the pose of the target object in the image than the selected training view when highly accurately deriving a 3D pose. In a case of finding a new training view, the processing section 167 highly accurately derives a 3D pose in the new training view. In the present embodiment, if views are different from each other, contour features as a set of visually recognizable edges including the 2D outline of the 3D model are also different from each other, and thus a new training view may be found. The processing section 167 uses a super-template for a problem that sets of visually recognizable edges are different from each other, and thus extracts as many visually recognizable edges as possible. In another embodiment, instead of using a template created in advance, the processing section 167 may image a target object, and may create a template by using 3D CAD data while reflecting an imaging environment such as illumination in rendering on the fly and as necessary, so as to extract as many visually recognizable edges as possible.

2D Point Correspondences (Step S27)

If the process in step S25 is completed, the processing section 167 correlates the edge of the image of the target object with 2D model points included in the template (step S27).

Figure 5:
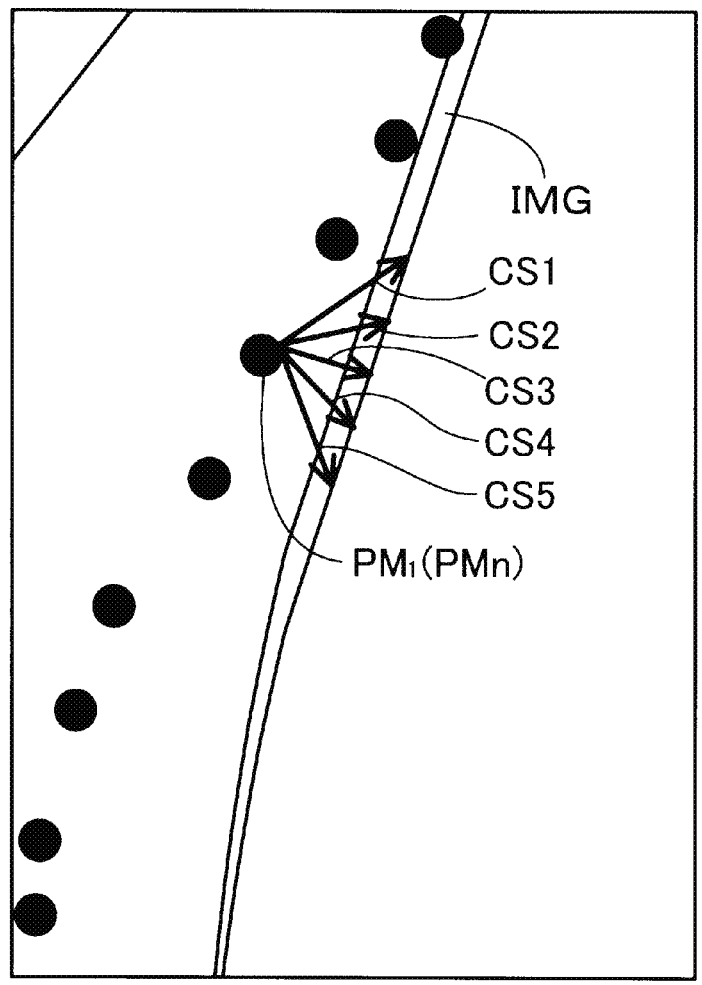
FIG. 5 is a diagram illustrating that a single 2D model point is combined with a plurality of image points included in a certain edge.
Figure 6:
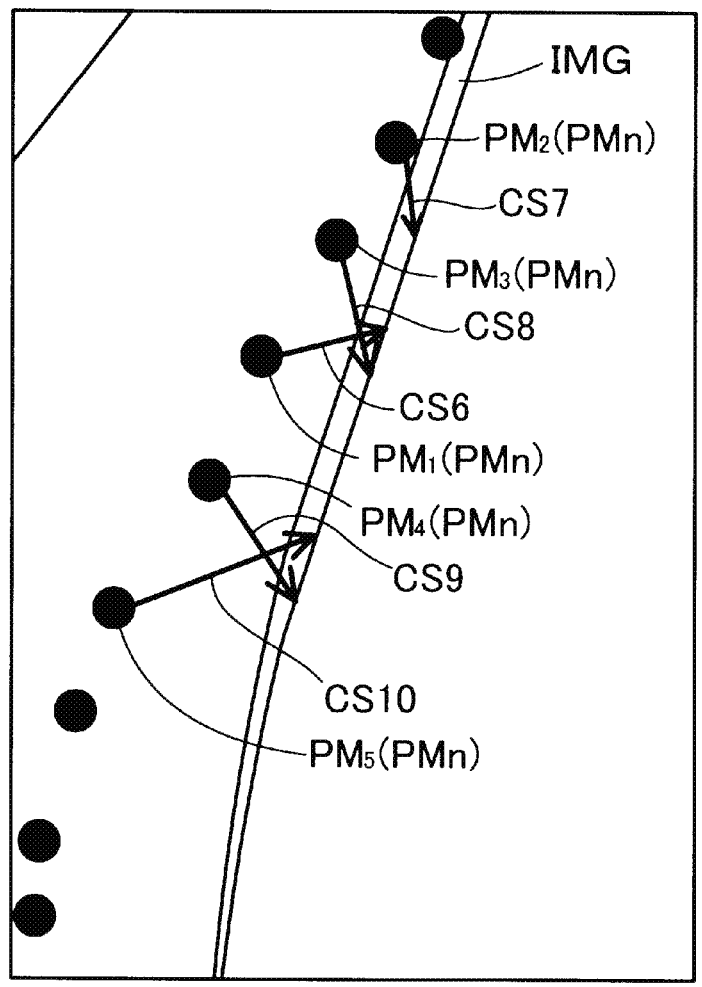
FIG. 6 is a diagram illustrating an example in which a 2D model point is combined with wrong image points.

FIG. 5 is a diagram illustrating that a single 2D model point is combined with a plurality of image points included in a certain edge. FIG. 6 is a diagram illustrating an example in which a 2D model point is combined with wrong image points. FIGS. 5 and 6 illustrate a captured image IMG of the target object OBm, a partial enlarged view of the 2D model point set PMn, and a plurality of arrows CS in a case where the target object OBm corresponding to a 3D model is imaged by the camera 60. As illustrated in FIG. 5, a portion of an edge detected from the image IMG of the target object OBm which is correlated with a 2D model point $PM_1$ which is one of the 2D model points included in a template includes a plurality of options as in the arrows CS1 to CS5. FIG. 6 illustrates an example in which 2D model points $PM_1$ to PM5 included in the template and arranged are wrongly combined with an edge (image points included therein) detected from the image IMG of the target object OBm. In this case, for example, in FIG. 6, despite the 2D model points PM2, PM3, PM1, PM4 and PM5 being arranged from the top, the arrows CS7, CS6, CS8, CS10 and CS9 are arranged in this order in the edge of the image IMG of the target object OBm. Thus, the arrow CS8 and the arrow CS6, and the arrow CS9 and the arrow CS10 are changed. As described above, the processing section 167 is required to accurately correlate 2D model points included in a template with image points included in an edge of the image IMG of the target object OBm to accurately estimate or derive a pose of the imaged target object OBm.

In the present embodiment, the processing section 167 computes similarity scores by using the following Equation (2) with respect to all image points included in a local vicinity of each projected 2D model point.

$$SIM(p, p') = \left| \vec{\nabla}_{E_p} \cdot \vec{\nabla} I_{p'} \right| / \max_{q \in N(p)} \left\| \vec{\nabla} I_p \right\| \quad (2)$$

The measure of similarity scores indicated in Equation (2) is based on matching between a gradient vector (hereinafter, simply referred to as gradient) of luminance of a 2D model point included in a template and a gradient vector of an image point, but is based on an inner product of the two vectors in Equation (2) as an example. The vector of Ep in Equation (2) is a unit length gradient vector of a 2D model point (edge point) p. The processing section 167 uses gradient $\vec{\nabla}I$ of a test image (input image) in order to compute features of an image point p' when obtaining the similarity scores. The normalization by the local maximum of the gradient magnitude in the denominator in Expression (11) ensures that the priority is reliably given to an edge with a locally high intensity. This normalization prevents an edge which is weak and thus becomes noise from being collated. The processing section 167 enhances a size N(p) of a nearest neighborhood region in which a correspondence is searched for when the similarity scores are obtained. For example, in a case where an average of position displacement of a projected 2D model point is reduced in consecutive iterative computations, N(p) may be reduced. Hereinafter, a specific method for establishing correspondences using Equation (2) will be described.

Figure 7:
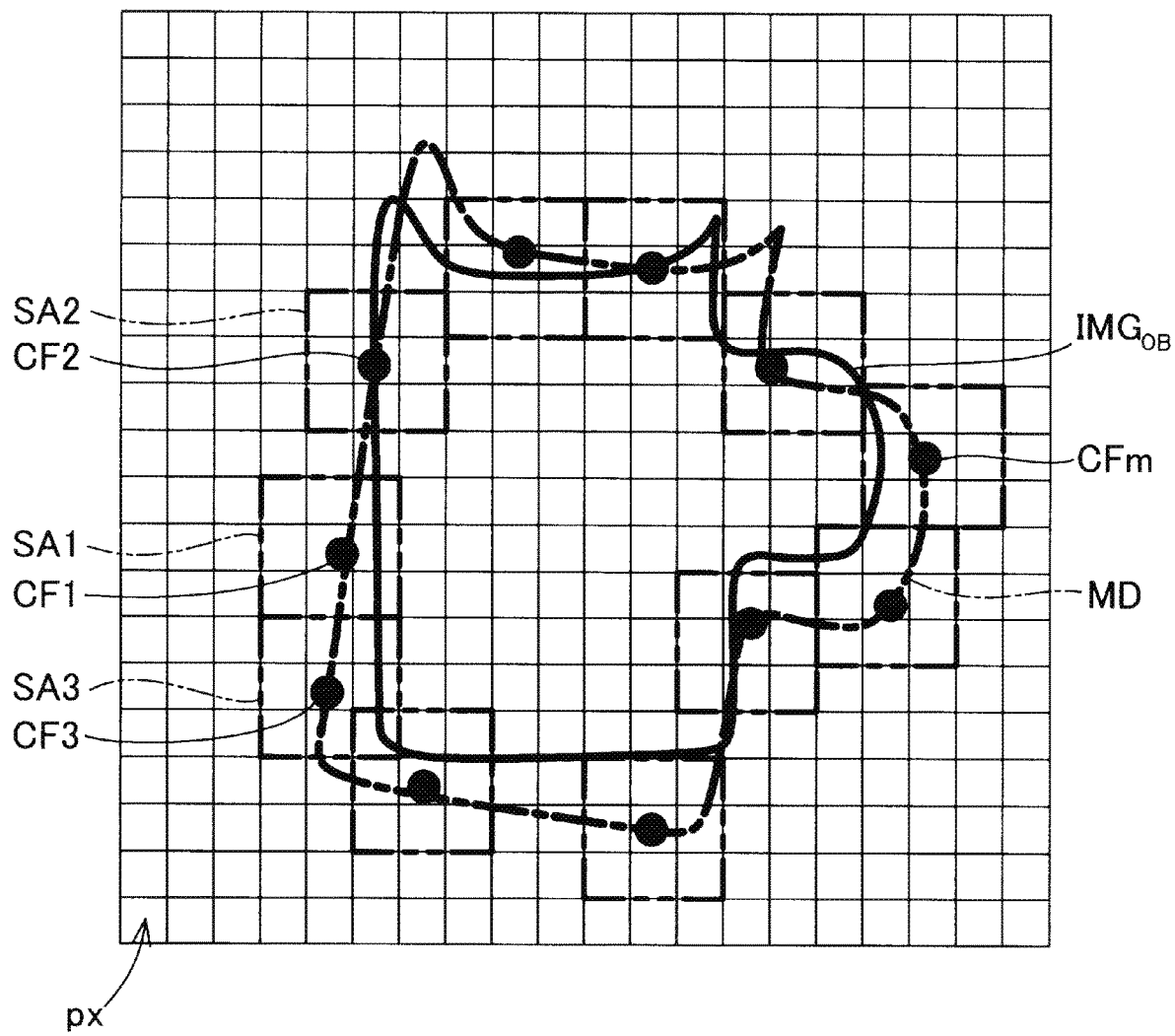
FIGS. 7 to 9 are diagrams illustrating an example of computation of similarity scores.
Figure 8:
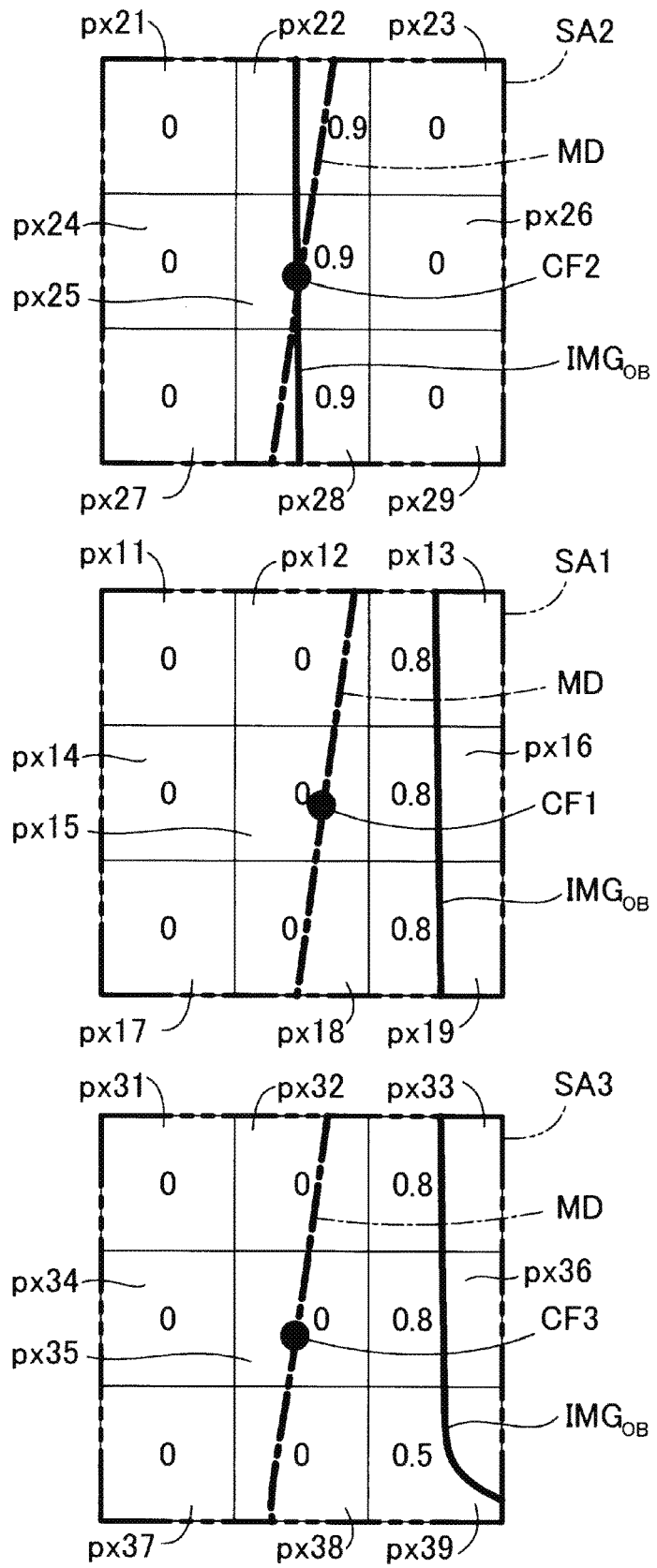
Figure 9:
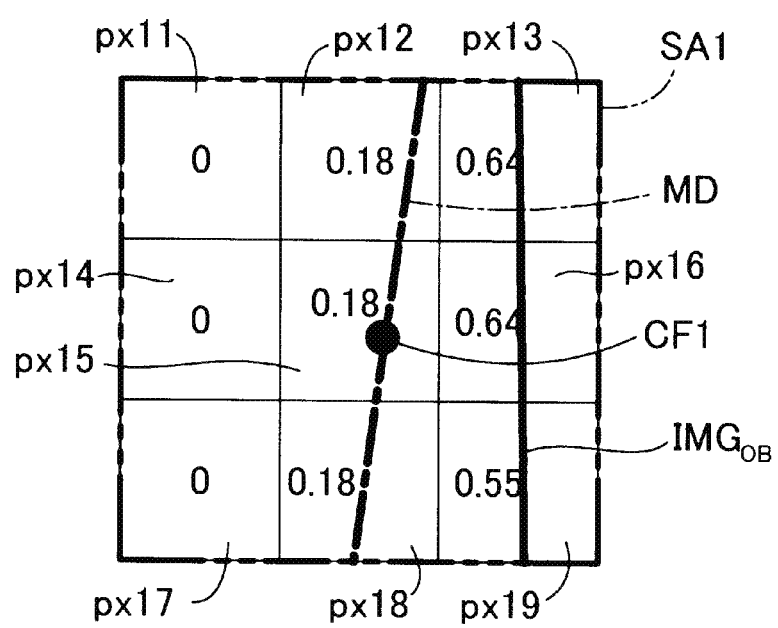

FIGS. 7 to 9 are diagrams illustrating an example of computation of similarity scores. FIG. 7 illustrates an image IMG$_{OB}$ (solid line) of a target object captured by the camera 60, a 2D model MD (dot chain line) based on a template similar to the image IMG$_{OB}$ of the target object, and 2D model points as a plurality of contour features CFm in the 2D model MD. FIG. 7 illustrates a plurality of pixels px arranged in a lattice form, and a region (for example, a region SA1) formed of 3 pixels×3 pixels centering on each of the contour features CFm. FIG. 7 illustrates the region SA1 centering on the contour feature CF1 which will be described later, a region SA2 centering on a contour feature CF2, and a region SA3 centering on a contour feature CF3. The contour feature CF1 and the contour feature CF2 are adjacent to each other, and the contour feature CF1 and the contour feature CF3 are also adjacent to each other. In other words, the contour features are arranged in order of the contour feature CF2, the contour feature CF1, and the contour feature CF3 in FIG. 7.

As illustrated in FIG. 7, since the image IMG$_{OB}$ of the target object does not match the 2D model MD, the processing section 167 correlates image points included in an edge of the image IMG$_{OB}$ of the target object with 2D model points represented by the plurality of contour features CFm of the 2D model MD, respectively, by using Equation (2). First, the processing section 167 selects the contour feature CF1 as one of the plurality of contour features CFm, and extracts the region SA1 of 3 pixels×3 pixels centering on a pixel px including the contour feature CF1. Next, the processing section 167 extracts the region SA2 and the region SA3 of 3 pixels×3 pixels respectively centering on the two contour features such as the contour feature CF2 and the contour feature CF3 which are adjacent to the contour feature CF1. The processing section 167 calculates a score by using Equation (2) for each pixel px forming each of the regions SA1, SA2 and SA3. In this stage, the regions SA1, SA2 and SA3 are matrices having the same shape and the same size.

FIG. 8 illustrates enlarged views of the respective regions SA1, SA2 and SA3, and similarity scores calculated for the respective pixels forming the regions SA1, SA2 and SA3. The processing section 167 calculates similarity scores between the 2D model point as the contour feature and the nine image points. For example, in the region SA3 illustrated on the lower part of FIG. 8, the processing section 167 calculates, as scores, 0.8 for pixels px33 and px36, 0.5 for a pixel px39, and 0 for the remaining six pixels. The reason why the score of 0.8 for the pixels px33 and px36 is different from the score of 0.5 for the pixel px39 is that the image IMG$_{OB}$ of the target object in the pixel px39 is bent and thus gradient differs. As described above, the processing section 167 calculates similarity scores of each pixel (image point) forming the extracted regions SA1, SA2 and SA3 in the same manner.

Hereinafter, a description will be made focusing on the contour feature CF1. The processing section 167 calculates a corrected score of each pixel forming the region SA1. Specifically, the similarity scores are averaged with weighting factors by using pixels located at the same matrix positions of the regions SA2 and SA3 as the respective pixels forming the region SA1. The processing section 167 performs this correction of the similarity scores not only on the contour feature CF1 but also on the other contour features CF2 and CF3. In the above-described way, it is possible to achieve an effect in which a correspondence between a 2D model point and an image point is smoothed. In the example illustrated in FIG. 8, the processing section 167 calculates corrected scores by setting a weighting factor of a score of each pixel px of the region SA1 to 0.5, setting a weighting factor of a score of each pixel px of the region SA2 to 0.2, and setting a weighting factor of a score of each pixel px of the region SA3 to 0.3. For example, 0.55 as a corrected score of the pixel px19 illustrated in FIG. 9 is a value obtained by adding together three values such as a value obtained by multiplying the score of 0.8 for the pixel px19 of the region SA1 by the weighting factor of 0.5, a value obtained by multiplying the score of 0 for the pixel px29 of the region SA2 by the weighting factor of 0.2, and a value obtained by multiplying the score of 0.5 for the pixel px39 of the region SA3 by the weighting factor of 0.3. The weighting factors are inversely proportional to distances between the processing target contour feature CF1 and the other contour features CF2 and CF3. The processing section 167 determines an image point having the maximum score among the corrected scores of the pixels forming the region SA1, as an image point correlated with the contour feature CF1. In the example illustrated in FIG. 9, the maximum value of the corrected scores is 0.64 of the pixels px13 and px16. In a case where a plurality of pixels have the same corrected score, the processing section 167 selects the pixel px16 whose distance from the contour feature CF1 is shortest, and the processing section 167 correlates the contour feature CF1 with an image point of the pixel px16. The processing section 167 compares edges detected in a plurality of images of the target object captured by the camera 60 with 2D model points in a template in a view close to the images of the target object, so as to determine image points of the target object corresponding to the 2D model points (contour features CF).

If the processing section 167 completes the process in step S27 in FIG. 4, the processing section 167 acquires 3D model points corresponding to the 2D model points correlated with the image points and information regarding the view which is used for creating the 2D model points, from the template of the target object stored in the template storage (step S29). The processing section 167 derives a pose of the target object imaged by the camera 60 on the basis of the extracted 3D model points and information regarding the view, and the image points (step S33). Details of the derivation are as follows.

Optimization of Pose (Step S33)

In the present embodiment, the processing section 167 highly accurately derives or refines a 3D pose of the target object by using contour features included in a template corresponding to a selected training view, and 3D model points corresponding to 2D model points included in the contour features. In the derivation, the processing section 167 derives a pose of the target object by performing optimization computation for minimizing Equation (5).

If the processing section 167 completes establishing the correspondences between 2D model points and the image points in a predetermined view, the processing section 167 reads 3D model points $P_i$ corresponding to the 2D model points (or the contour features $CF_i$) from a template corresponding to the view. In the present embodiment, as described above, the 3D model points $P_i$ corresponding to the 2D model points are stored in the template. However, the 3D model points $P_i$ are not necessarily stored in the template, and the processing section 167 may inversely convert the 2D model points whose correspondences to the image points is completed, every time on the basis of the view, so as to obtain the 3D model points $P_i$.

The processing section 167 reprojects locations of the obtained 3D model points $P_i$ onto a 2D virtual plane on the basis of Equation (3).

$$\pi(P_i)=(u_i,v_i)^T \quad (3)$$

Here, π in Equation (3) includes a rigid body transformation matrix and a perspective projecting transformation matrix included in the view. In the present embodiment, three parameters indicating three rotations about three axes included in the rigid body transformation matrix and three parameters indicating three translations along the three axes are treated as variables for minimizing Equation (5). The rotation may be represented by a quaternion. The image points $p_i$ corresponding to the 3D model points $P_i$ are expressed as in Equation (4).

$$p_i=(p_{ix},p_{iy})^T \quad (4)$$

The processing section 167 derives a 3D pose by using the cost function expressed by the following Equation (5) in order to minimize errors between the 3D model points $P_i$ and the image points $p_i$.

$$E_{match} = \sum_{i=1}^{N} w_i * \|\pi(P_i) - p_i\| = \sum_{i=1}^{N} w_i * ((u_i - p_{ix})^2 + (v_i - p_{iy})^2) \quad (5)$$

Here, $w_i$ in Equation (5) is a weighting factor for controlling the contribution of each model point to the cost function. A point which is projected onto the outside of an image boundary or a point having low reliability of the correspondence is given a weighting factor of a small value. In the present embodiment, in order to present specific adjustment of a 3D pose, the processing section 167 determines minimization of the cost function expressed by Equation (5) as a function of 3D pose parameters using the Gauss-Newton method, if one of the following three items is reached:

1. An initial 3D pose diverges much more than a preset pose. In this case, it is determined that minimization of the cost function fails.

2. The number of times of approximation using the Gauss-Newton method exceeds a defined number of times set in advance.

3. A relative pose change in the Gauss-Newton method is equal to or less than a preset threshold value. In this case, it is determined that the cost function is minimized.

When a 3D pose is derived, the processing section 167 may attenuate refinement of a pose of the target object. Time required to process estimation of a pose of the target object directly depends on the number of iterative computations which are performed so as to achieve high accuracy (refinement) of the pose. From a viewpoint of enhancing the system speed, it may be beneficial to employ an approach that derives a pose through as small a number of iterative computations as possible without compromising the accuracy of the pose. According to the present embodiment, each iterative computation is performed independently from its previous iterative computation, and thus no constraint is imposed, the constraint ensuring that the correspondences of 2D model points are kept consistent, or that the same 2D model points are correlated with the same image structure or image points between two consecutive iterative computations. As a result, particularly, in a case where there is a noise edge structure caused by a messy state in which other objects which are different from a target object are mixed in an image captured by the camera 60 or a state in which shadows are present, correspondences of points are unstable. As a result, more iterative computations may be required for convergence. According to the method of the present embodiment, this problem can be handled by multiplying the similarity scores in Equation (2) by an attenuation weighting factor shown in the following Equation (6).

$$w(\overrightarrow{\Delta p}) = e^{-(\|\overrightarrow{\Delta p}\|^2)/\sigma^2} \quad (6)$$

Equation (6) expresses a Gaussian function, and σ has a function of controlling the strength (effect) of attenuation. In a case where a value of σ is great, attenuation does not greatly occur, but in a case where a value of σ is small, strong attenuation occurs, and thus it is possible to prevent a point from becoming distant from the present location. In order to ensure consistency in correspondences of points in different iterative computations, in the present embodiment, σ is a function of a reprojecting error obtained through the latest several iterative computations. In a case where a reprojecting error (which may be expressed by Equation (5)) is considerable, in the method of the present embodiment, convergence does not occur. In an algorithm according to the present embodiment, σ is set to a great value, and thus a correspondence with a distant point is ensured so that attenuation is not almost or greatly performed. In a case where a reprojecting error is slight, there is a high probability that a computation state using the algorithm according to the present embodiment may lead to an accurate solution. Therefore, the processing section 167 sets σ to a small value so as to increase attenuation, thereby stabilizing the correspondences of points.

To enhance the user's AR experience, embodiments of the present disclosure allow a user to select an object or a portion of an object and receive an output from the AR device that is based on the selected object or portion of the object. The example embodiments generally may be classified into two categories, embodiments that use a cursor, and embodiments that do not use a cursor.

Figure 10:
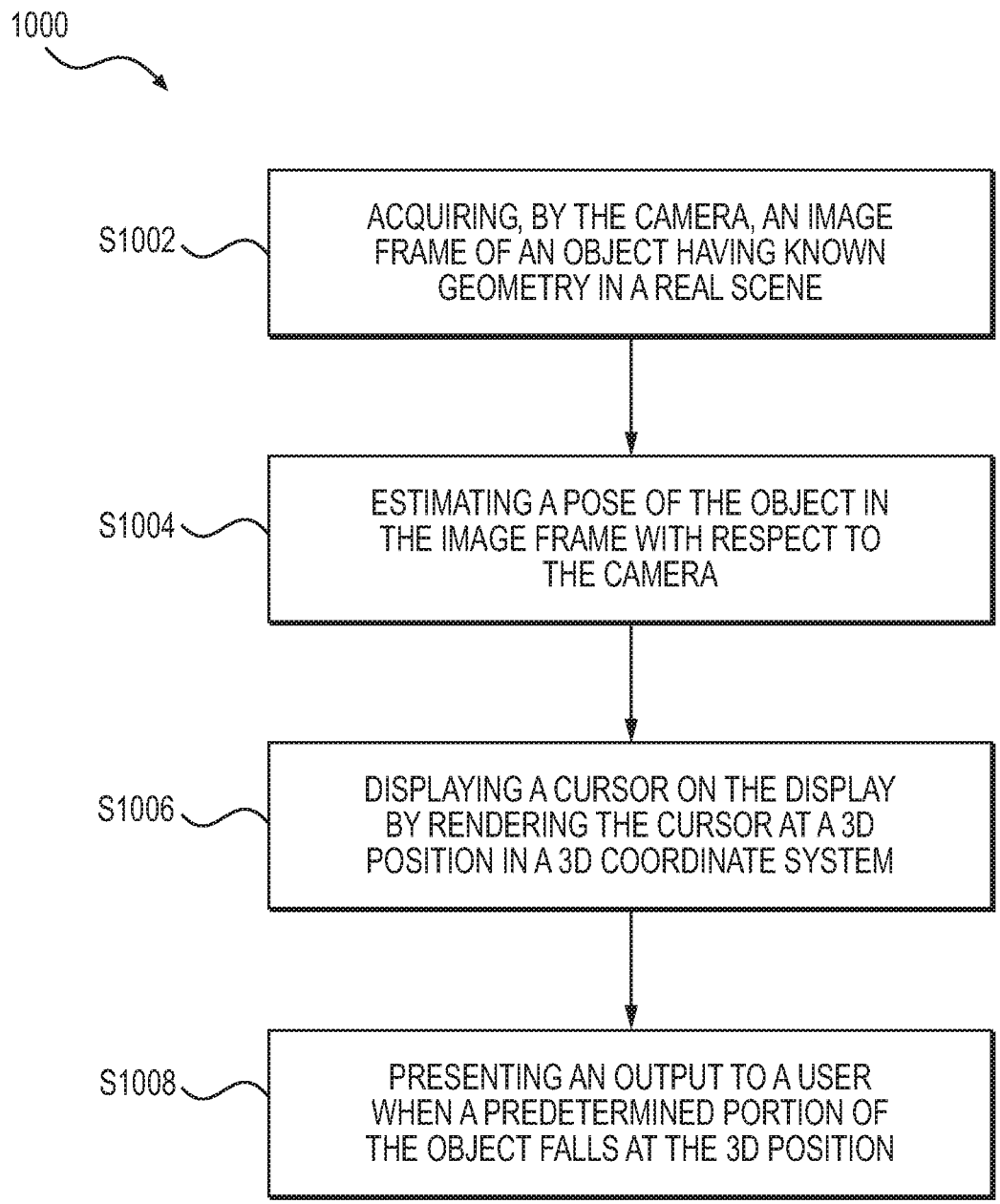
FIG. 10 is a flow diagram of an example embodiment of a method using a cursor.

FIG. 10 is a flow diagram of an example embodiment of a method 1000 using a cursor for one or more processors to implement in a device having a camera and a display. The method 1000 will be described with respect to the HMD 100 and its components. However, the method 1000 may be used with any suitable device for AR, for example, a mobile phone, a computer connected to a camera, a tablet computer, and the like.

The method 1000 includes acquiring, by the camera 60, an image frame of an object having known geometry in a real scene (S1002). The processor 140 of the HMD 100 then estimates a pose of the object in the image frame with respect to the camera 60 (S1004). The pose may be estimated, for example, using the process described above based on template data corresponding to the object at one or more known poses. In some embodiments, the pose is estimated by deriving the pose from a pose in a prior image frame. In other embodiments any other suitable pose estimation process may be used.

At S1006, the processor 140 displays a cursor on the display section 20 by rendering the cursor at a 3D position in a 3D coordinate system.

Prior to operating the HMD 100 to perform the method 1000, a calibration process is typically performed. In the calibration process, the HMD 100 attempts to align the 3D coordinate system of the user or the display with the 3D coordinate system of the camera 60. This calibration allows the HMD 100 to display an image on the display section 20 (and more particularly to display images on the right optical-image display 26 and the left optical-image display 28) so that the user perceives the displayed image at a 3D position in the real world that corresponds to the 3D position in the camera's 3D coordinate system. Thus, for example, if the target object was a model of an ambulance with a light bar on top, the HMD 100 can identify the light bar in a captured image and render images of flashing lights at a 3D position in the user's 3D coordinate system that corresponds to the 3D position of the light bar in the captured image (the camera's 3D coordinate system). The rendered flashing lights would appear to the user as being located at the light bar of the ambulance. Therefore, after calibration, the 3D coordinate system of the camera 60 and the user's 3d coordinate system are treated as if they are the same, since the calibration provides knowledge of a spatial relationship between two or more 3D coordinate systems, in a form of, for example, a transformation matrix. To avoid unnecessary complication herein, both coordinate systems are referred to herein as the 3D coordinate system, unless distinction between the two is relevant to understanding.

Figure 11:
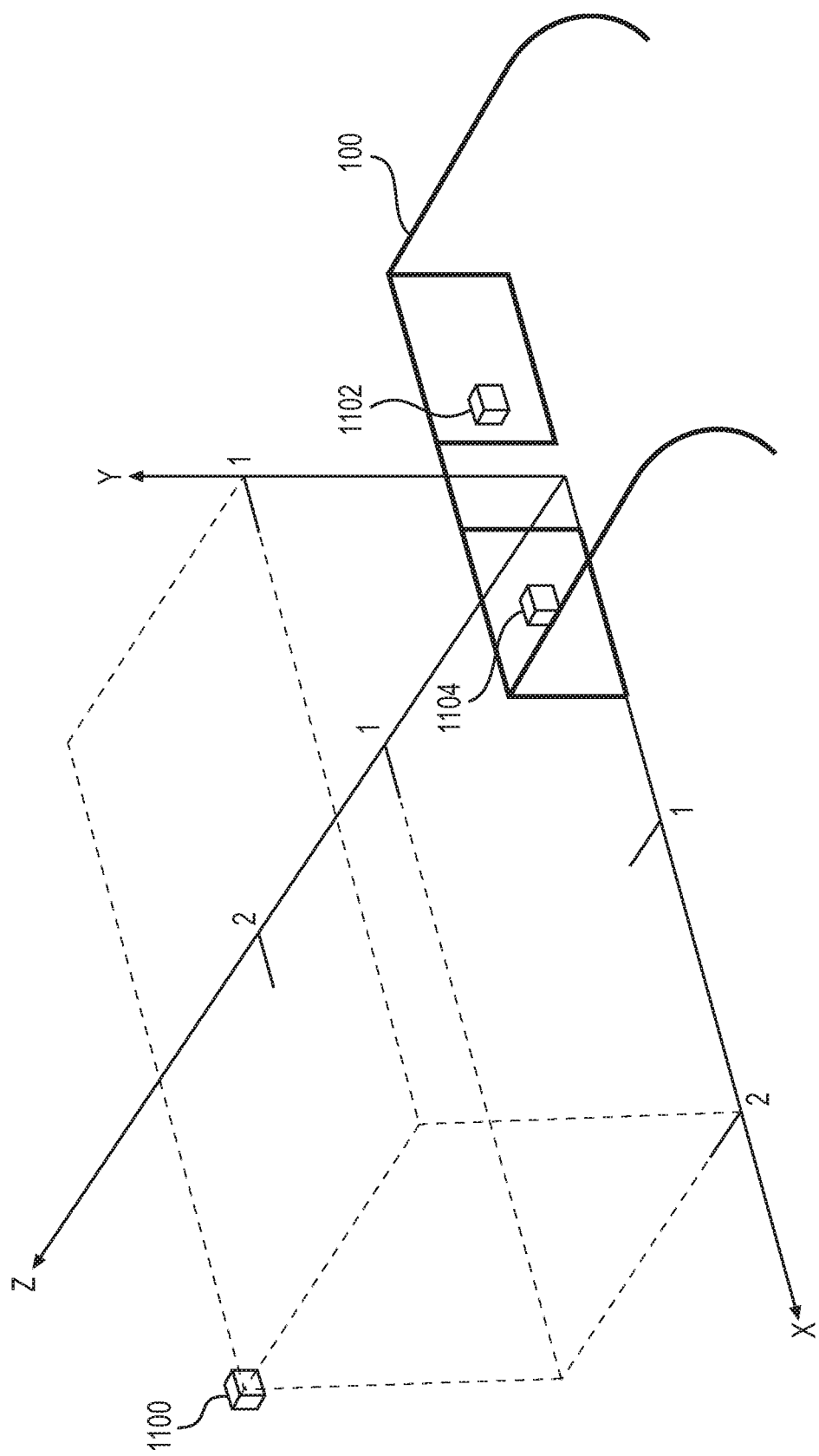
FIG. 11 illustrates the three dimensions of X, Y, and Z relative to an HMD.

In some embodiments, the 3D position is a fixed position in the 3D coordinate system. The 3D position is fixed in at least two dimensions of the 3D coordinate system. As shown in FIG. 11, the three dimensions of X, Y, and Z correspond to left/right, up/down, and distance (forward/backward) relative to the HMD 100 (and the user, when the user is wearing the HMD 100). Thus, the X and Y dimensions define a plane parallel to the right optical-image display 26 and the left optical-image display 28, while the Z dimension determines how far away (in front or behind) a point is from the HMD 100 (and the user). As shown in FIG. 11, left image 1104 of a cursor 1100 and right image 1102 of the cursor 1100 are displayed on the HMD 100. The user will experience the two images 1102 and 1104 as a single, 3D cursor 1100 and the 3D position with an X coordinate of 2, a Y coordinate of 1, and a Z coordinate of 1. The 3D coordinate system remains fixed with respect to the HMD and the user (if the user is wearing the HMD). Thus, a 3D coordinate, for example of the cursor 1100, will remain fixed relative to the HMD, but may occupy a different location in the real world as the user moves her head in the real world space. The scale, location of the origin of the coordinate system in FIG. 11 (except that the origin of the Z axis will generally be located at the front of the HMD 100 and the X-X axes will be parallel to the front of the HMD), as well as the location of the cursor 1100 are all arbitrary in FIG. 11, and are selected merely for explanatory purposes. Additionally, although the cursor 1100 is illustrated as a rectangular solid, the cursor 1100 may have any suitable shape. Generally, in some embodiments, a 3D shape may be preferred for the cursor 1100, because the cursor 1100 may be intended to appear in a 3D view and interact with 3D objects. In some embodiments, the cursor 1100 is a spherical shape, while in other embodiments, the cursor 1100 has a different 3D shape. In still other embodiments, the cursor 1100 may be a single point, or a 2D shape.

In a first example, the 3D position is fixed in all three dimensions of the 3D coordinate system relative to the user. In such embodiments, the cursor will appear to the user to be positioned at a fixed point at a fixed distance from the user. As the user moves her head and/or moves her body such that the view of the real world changes, the cursor will remain fixed with respect to the user. By moving her head and/or body to change the view of the real world, the user can change the apparent position of the cursor relative to the real world. Thus, if the cursor appears to the right of a target object, the user may rotate her head to the left until the cursor falls on (or intersects) at least part of the target object. If the cursor appears aligned with the target object, but appears some distance in front of or behind the object, the user can move closer or further away (respectively) until the cursor falls at at least part of the target object. In some embodiments using such a fixed cursor, the cursor is displayed to appear centered in the users vision a fixed distance in front of the user.

In another example, the 3D position is fixed in the X and Y dimensions (left/right and up/down) of the 3D coordinate system relative to the user. In such embodiments, the cursor will appear to the user to be positioned at a fixed point in the X and Y dimensions at a variable distance (Z direction) from the user. For any particular distance, the user moves the apparent position of the cursor left/right and/or up/down by moving her head and/or body relative to the scene.

The distance of the cursor from the user may be varied according to several possible embodiments.

In a first example, the user may manually control the distance using a distance controller coupled to or part of the HMD 100, such as a distance slider, a mouse, a track ball, a controller displayed on a touchscreen display device, or the like.

In other embodiments, the position in the Z axis is controlled by the HMD 100. If the HMD 100 is tracking a target object with the user's view, the HMD 100 knows the distance that the target object is from the user and/or the HMD 100. In some embodiments, if the HMD 100 is only tracking one target object within the user's field of view, the HMD 100 may select the Z coordinate of the 3D position to be a coordinate that is the same distance from the user as the target object. If multiple possible target objects are within the field of view, the HMD 100 may set the Z coordinate based on the distance to the target object that is nearest (in the other two directions) to the cursor. In still other embodiments, the HMD 100 may control the Z coordinate based on the other objects (including non-tracked objects) in the scene, such that the Z coordinate is defined by the apparent intersection of objects in the scene with a ray extending in the Z direction at the fixed X and coordinates.

In other embodiments, the 3D position is variable in one or more dimensions based on the position of the user's eyes. In such embodiments, the HMD 100 includes at least one camera facing the user to capture images of the user's eyes.

Figure 12:
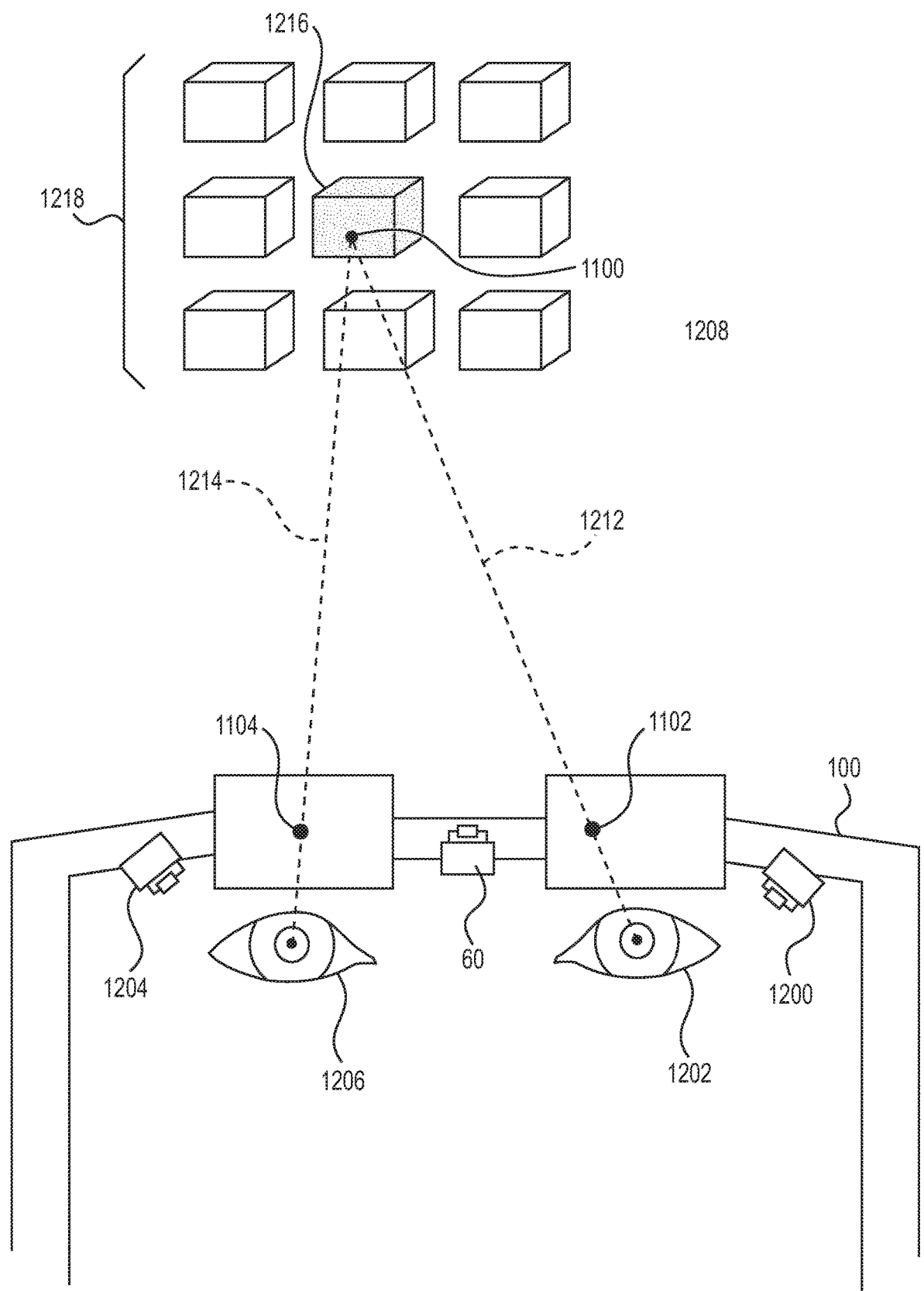
FIG. 12 is an example HMD in which the 3D position of a cursor is determined based on the position of the user's eyes.

FIG. 12 is an example embodiment of such an embodiment in which the 3D position of the cursor 1100 is determined based on the position of the user's eyes. In the embodiment of FIG. 12, the HMD 100 also includes a right camera 1200 capturing images of the users right eye 1202, and a left camera 1204 capturing images of the user's left eye 1206. Based on the images, a right ray 1212 extending from the user's right eye 1202 in the direction that the right eye 1202 is looking and a left ray 1214 extending from the user's left eye 1206 in the direction that the left eye 1206 is looking are calculated. The intersection of the right and left rays 1212 and 1214 is calculated and used as the 3D position at which the cursor 1100 is rendered. In particular, the left image 1104 of the cursor 1100 and right image 1102 of the cursor 1100 are displayed on the HMD 100, resulting in the appearance of the cursor 1100 at the 3D position to the user. As the user moves her eyes, the 3D position is recalculated to correspond to the new intersection point of the new rays 1212 and 1214. Thus the user can control the location of the 3D position, and accordingly the position of the cursor 1100, by looking at a point where the user desires the cursor 1100 to be located.

Some embodiments combine a fixed 3D position with a variable 3D position based on the position of the user's eyes. Thus, for example, the 3D position may be fixed in the X and Y directions, but variable in the Z direction based on the position of the user's eyes.

Returning to FIG. 10, regardless of whether the 3D position is fixed or variable, at S1008, an output is presented to the user when a predetermined portion of the target object falls at the 3D position. Thus, for example, in FIG. 12, the cursor 1100 is positioned such that the portion 1216 of the target object 1218 falls at (e.g. occupies at least some of the same 3D space as) the 3D position represented by the cursor 1100. Accordingly, at S1008, HMD provides an output to the user. In some embodiments, the predetermined position may include the entire target object.

The content of the output to the user is based on the predetermined portion of the object. Thus, for example, if the object 1218 is a projector and the portion 1216 is a lens of the projector, the output may provide the user with technical specifications of the lens. Alternatively or additionally, the output may provide the user with an exploded view of the lens, a cost of the lens, alternative lenses available, an animation related to the lens, help/repair information related to the lens, or any other suitable output related to the lens. If the portion 1216 is instead a main body of the projector, similar output related to the overall projector may be provided to the user.

The output to the user is a human cognizable output. For example, the output may be a visible output on the HMD or another display. In particular, the visible output may be in the form of 3D images, effects, or animation presented to the user using the display section 20, such that the output forms part of the AR experienced by the user. Additionally, or alternatively, the output may be an audio output, such as through the earphones 32 and 34 or any other suitable speaker. Thus, the output audibly describe components, features, repair steps, technical features, and the like to the user based on the predetermined portion of the object that falls at the 3D position. Further, in some embodiments, the output is a haptic output. Thus, for example, the HMD 100 may output a vibration, a force against the user's body, or any other suitable haptic output. The hardware for outputting the output to the user may sometimes be referred to herein as a user interface hardware component. Such user interface hardware components include, for example, displays, audio speakers, vibration motors, and the like.

In some embodiments, the HMD presents the output to the user when the predetermined portion of the target object falls at the 3D position for longer than a predetermined amount of time. In such embodiments, the output is not provided to the user as the user looks around and the predetermined portion of the target object falls at the 3D position for only a brief time (i.e., less than the predetermined amount of time). This helps minimize the distraction of output being constantly provided to the user when the user is not actually looking at the predetermined position, but only moved her vision (and the cursor) across the predetermined position. By maintaining her view, and the cursor 1100, on the predetermined portion 1216 for longer than the predetermined amount of time, the user (knowingly or unknowingly) selects the predetermined portion 1216 and the HMD 100 provides the output to the user. In an example embodiment, the predetermined amount of time is about one second. In other embodiments, the predetermined amount of time is about one-half a second, two seconds, three seconds, four seconds, five seconds, or any other suitable amount of time. Generally, the amount of time should be selected to be long enough to avoid unwanted selections of the predetermined portion, but short enough for the output to be triggered before the user loses interest in the predetermined portion or questions whether or not the HMD 100 is working.

In some embodiments, the 3D position includes a tolerance around the precise location of the 3D position. In such embodiments, the predetermined portion of the target object falls at the 3D position when the predetermined portion of the target object falls less than a predetermined distance from the 3D position. This feature may improve the ability of the user to select the predetermined portion when the user is having difficulty precisely aiming the 3D position at the predetermined spot. In some embodiments, the 3D position is a single point and the size of the cursor 1100 around the single point represents the predetermined distance. In other embodiments, the predetermined distance is determined without regard for the size of the cursor and may extend beyond the outside edges of the cursor. Additionally, in some embodiments, this tolerance is combined with the time requirement discussed above, such that the output is provided when the predetermined portion of the target object falls less than a predetermined distance from the 3D position for longer than the predetermined amount of time.

Thus, the embodiments discussed above use a cursor to allow a user to select a portion of a target object and receive an output based on the selected portion. Moreover, in some embodiments, the same technique is used to allow a user to select a particular target object from among multiple target objects.

In the second set of embodiments, similar results are achieved without displaying a cursor to the user.

The first cursor-less embodiment generally operates the same as the embodiments discussed above, but without displaying the cursor. Thus, the 3D position (whether fixed or variable) is calculated and an output is presented to the user when a predetermined portion of the target object falls at the 3D position. In such embodiments, a fixed 3D position may best be selected at a central position at which a user is most likely to be focusing her view. Embodiments using a 3D position based on the position of the user's eyes automatically select a 3D position that corresponds to the position at which the user is looking. Thus, the user can select the predetermined portion of the object by looking at it, without a cursor having been displayed to the user.

Figure 13:
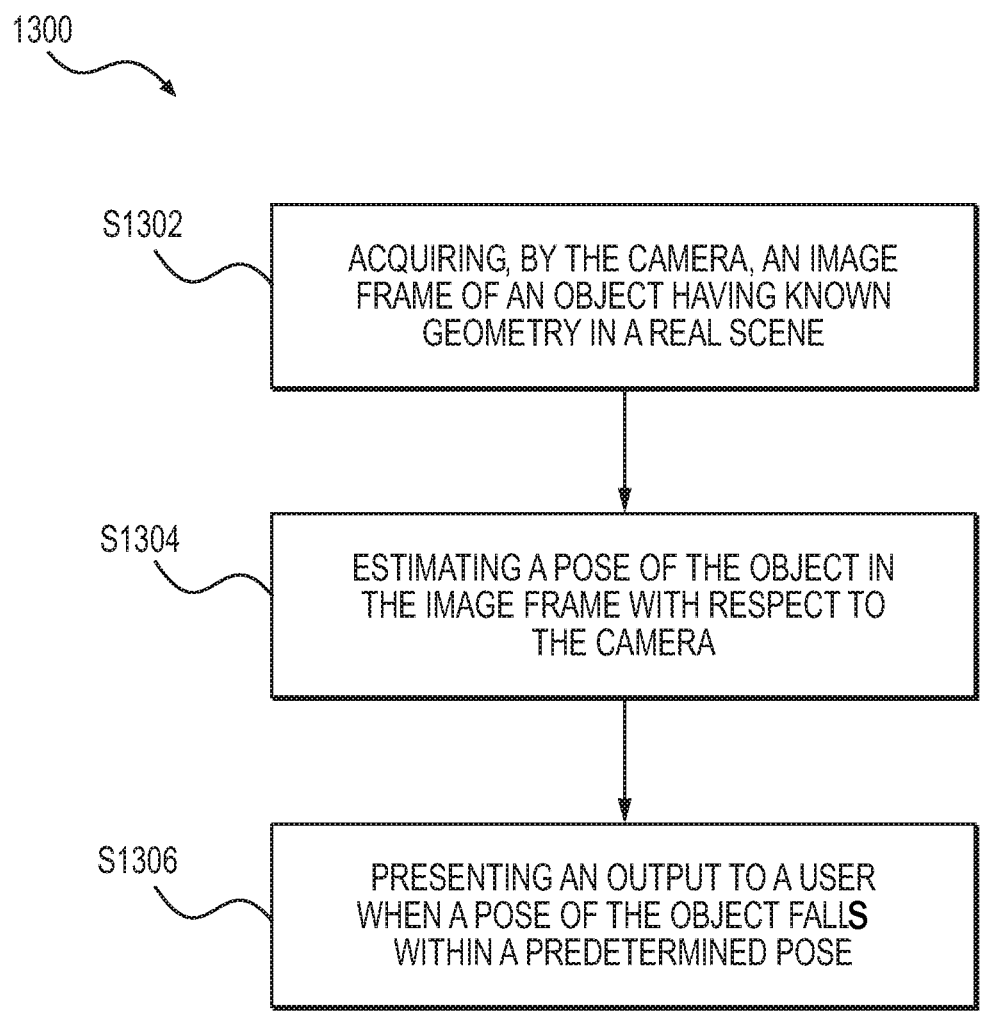
FIG. 13 is a flow diagram of an example method that which does not use a cursor.

FIG. 13 is a flow diagram of another example method 1300 for one or more processors to implement in a device having a camera and a display, which does not use a cursor. The method 1300 will be described with respect to the HMD 100 and its components. However, the method 1300 may be used with any suitable device for AR, for example, a mobile phone, a computer connected to a camera, a tablet computer, and the like.

The method 1300 includes acquiring, by the camera 60, an image frame of an object having known geometry in a real scene (S1302). The processor 140 of the HMD 100 then estimates a pose of the object in the image frame with respect to the camera 60 (S1304). The pose may be estimated, for example, using the process described above based on template data corresponding to the object at one or more known poses. In some embodiments, the pose is estimated by deriving the pose from a pose in a prior image frame. In other embodiments any other suitable pose estimation process may be used.

At S1306, an output is presented to a user when the pose of the object falls within a predetermined pose. The predetermined pose may be, for example, a pose in which a predetermined portion of the object (as discussed in the cursor embodiments) is visible.

Figure 14:
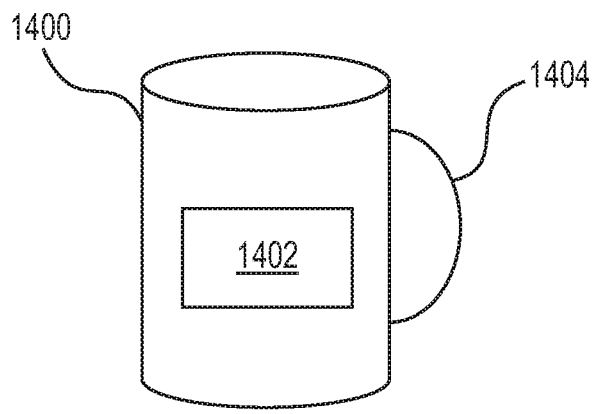
FIGS. 14, 15 and 16 are images of a target object in three different poses.
Figure 15:
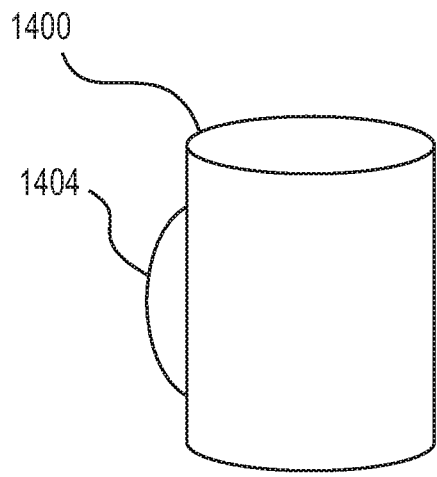
Figure 16:
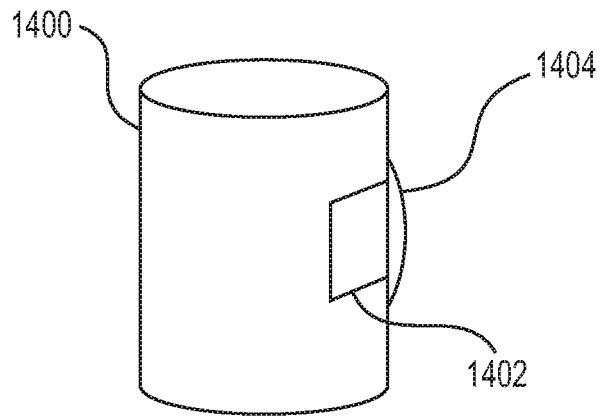

FIGS. 14-16 are images of a target object 1400 in three different poses. FIG. 14 shows the target object 1400 in the predetermined pose. When the HMD 100 estimates the pose of the target object 1400 to be the same as the pose in FIG. 14, the output is presented to the user. If the estimated pose of the object is the pose shown in FIG. 15 or FIG. 16, neither of which matches the predetermined pose in FIG. 14, the output is not presented to the user.

As with the output in the embodiments including a cursor, in the cursor-less embodiments, the output to the user is a human cognizable output. For example, the output may be a visible output on the HMD or another display. In particular, the visible output may be in the form of 3D images, effects, or animation presented to the user using the display section 20, such that the output forms part of the AR experienced by the user. Additionally, or alternatively, the output may be an audio output, such as through the earphones 32 and 34 or any other suitable speaker. Thus, the output audibly describes components, features, repair steps, technical features, and the like to the user based on the predetermined pose. Further, in some embodiments, the output is a haptic output. Thus, for example, the HMD 100 may output a vibration, a force against the user's body, or any other suitable haptic output. The hardware for outputting the output to the user may sometimes be referred to herein as a user interface hardware component. Such user interface hardware components include, for example, displays, audio speakers, vibration motors, and the like.

The content of the output to the user is based on the predetermined pose of the object. Thus, for example, if the predetermined pose is the pose in FIG. 14, the output may be related to a feature 1402 visible in that pose. Additionally or alternatively, the output may be related to a feature 1404 or any other feature that is also visible in that pose.

In some embodiments, the predetermined pose may be more than one pose. In such embodiments the output may be presented to a user when the pose of the object falls within any of the predetermined poses. Thus, for example, for output related to feature 1404, both the pose in FIG. 14 and the pose in FIG. 16 may be predetermined poses. If the pose of the target object 1400 is estimated to be either of these two poses, the output is provided to the user. If however, the pose is estimated to be the pose in FIG. 15, which does not fall within either pose of the predetermined pose, the output is not provided to the user.

Moreover, the predetermined pose need not relate to a particular feature or portion of the target object. For example, a predetermined pose (or group of poses) may be poses in which the front of the target object is visible, with poses that include only the back or sides of the object are not predetermined poses. Thus, the output is provided when the user is viewing the front of the object (and more likely to be actually looking at the object) rather than when the user is looking at the rear of the object. Similarly, if the output includes repair information, the predetermined pose may be a pose in which the underside of the target object is visible.

In some embodiments, the HMD presents the output to the user when estimated pose of the object falls within the predetermined pose for longer than a predetermined amount of time. In such embodiments, the output is not provided to the user as the user looks around and briefly (i.e., for less than the predetermined amount of time) causes the estimated pose to fall within the predetermined pose. This helps minimize the distraction of output being constantly provided to the user when the user is not actually looking at the predetermined position. By maintaining her view with the target object in the predetermined pose, for longer than the predetermined amount of time, the user (knowingly or unknowingly) selects the target object in the pose, and the HMD 100 provides the output to the user. In an example embodiment, the predetermined amount of time is about one second. In other embodiments, the predetermined amount of time is about one-half a second, two seconds, three seconds, four seconds, five seconds, or any other suitable amount of time. Generally, the amount of time should be selected to be long enough to avoid unwanted selections, but short enough for the output to be triggered before the user loses interest or questions whether or not the HMD 100 is working.

In some embodiments, the 3D position includes a tolerance around the precise pose. Thus, there may be a range of predetermined poses around a particular predetermined pose, all of which fall within the predetermined pose.

Thus, the cursor-less embodiments discussed above allow a user to select a target object by moving her view such that the pose of the target object is in the predetermined pose. In response, the user receives an output based on the predetermined pose. The method 1300 may provide such user interactivity/selectability at a lower computing and memory cost than some other methods, because the pose tracking is already being performed by the HMD and the current estimated pose only needs to be compared to the predetermined pose to determine when to provide an output (and what output to provide) to a user.

Although the embodiments including a cursor and the cursor-less embodiments were described separately, features of both types of embodiments may be combined in a single device. For example, the cursor-less techniques may be used by HMD 100 to provide a first type of output to a user (e.g., output related to the target object in general), and the cursor based techniques may be used to provide output to a user related to specific portions of the target object.

Some embodiments provide a non-transitory storage medium (e.g. ROM 121, RAM 122) containing program instructions that, when executed by a computer processor (e.g. CPU 140 or processing section 167), perform the methods described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for one or more processors to implement in a device having a camera and a display, comprising:
   acquiring, by the camera, an image frame of an object having known geometry in a real scene;
   estimating a pose of the object in the image frame with respect to the camera;
   displaying a cursor on the display by rendering the cursor at a 3D position in a 3D coordinate system while allowing the cursor to move with respect to the object on the display in correspondence to camera movement with respect to the object; and
   presenting an output to a user when a predetermined portion of the object falls at the 3D position of the cursor as a result of the camera movement, the content of the output being based on the predetermined portion of the object.

2. The method according to claim 1, wherein estimating a pose of the object comprises at least one of (i) estimating a first pose as the pose of the object in the image frame with respect to the camera using template data based on a 3D model corresponding to the object at one or more known poses, and (ii) estimating a second pose as the pose of the object by tracking from the first pose estimated with the template data based on the 3D model.

3. The method according to claim 1, wherein presenting an output to a user comprises presenting an output to a user through a user interface hardware component coupled to the device.

4. The method according to claim 3, wherein presenting an output to a user comprises presenting an output to a user through a user interface hardware component comprising the display, an audio speaker, and/or a haptic device.

5. The method according to claim 1, further comprising tracking an orientation of the user's eyes, and determining the 3D position in the 3D coordinate system based on the tracked orientation of the user's eyes.

6. The method according to claim 5, wherein determining the 3D position in the 3D coordinate system based on the tracked orientation of the user's eyes comprises:
   determining an intersection point of imaginary lines extending from the user's eyes in the tracked orientation, and
   setting the determined intersection point as the 3D position at which the cursor is rendered in the 3D coordinate system.

7. The method according to claim 1, wherein displaying a cursor on the display comprises displaying a cursor on the display by rendering the cursor at a 3D position fixed in at least two dimensions of a 3D coordinate system.

8. The method according to claim 1, wherein the device comprises a head-mounted display device including the camera and the display, and the display comprises an optical see-through display.

9. The method according to claim 1, wherein presenting an output to a user when a predetermined portion of the object falls at the 3D position comprises presenting an output to a user when a predetermined portion of the object falls at the 3D position for longer than a predetermined amount of time.

10. The method according to claim 1, wherein presenting an output to a user when a predetermined portion of the object falls at the 3D position comprises presenting an output to a user when a predetermined portion of the object falls at a position less than a predetermined distance from the 3D position.

11. A non-transitory computer readable medium storing instructions that, when executed by a processor, executes a method, the method comprising:
   acquiring, by a camera, an image frame of an object having known geometry in a real scene;
   estimating a pose of the object in the image frame with respect to the camera;
   displaying a cursor on the display by rendering the cursor at a 3D position in a 3D coordinate system while allowing the cursor to move with respect to the object on the display in correspondence to camera movement with respect to the object; and
   presenting an output to a user when a predetermined portion of the object falls at the 3D position of the cursor as a result of the camera movement, the content of the output being based on the predetermined portion of the object.

12. The non-transitory computer readable medium according to claim 11, wherein estimating a pose of the object comprises estimating a pose of the object in the image frame with respect to the camera using at least one of (i) template data corresponding to the object at one or more known poses, and (ii) another pose that is derived from another image frame prior to the image frame, wherein the pose of the object relates to a rotational relation between the camera and the object.

* * * * *